H. T. SMITH.
SIDE HARROW FOR CULTIVATORS.
APPLICATION FILED DEC. 30, 1909.
974,098.
Patented Oct. 25, 1910.
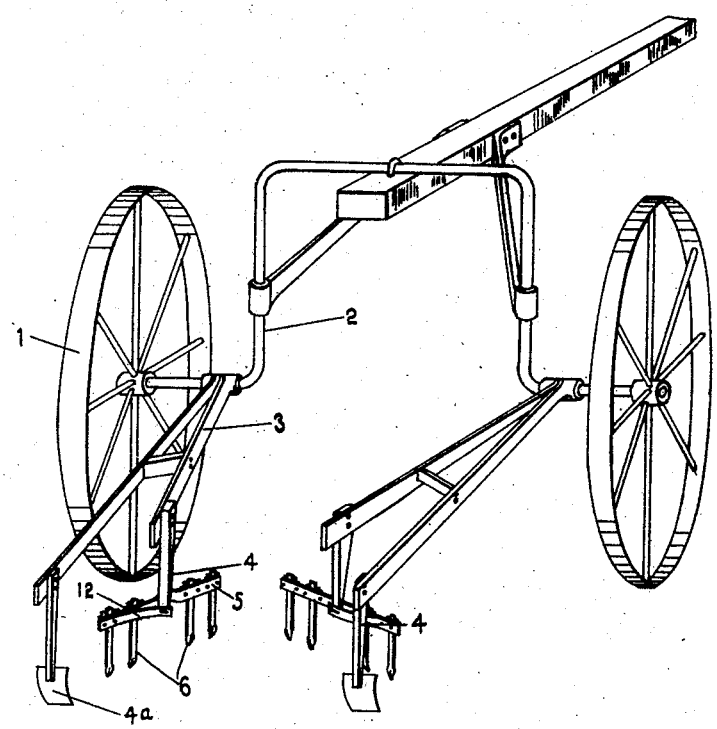
Fig. 1.
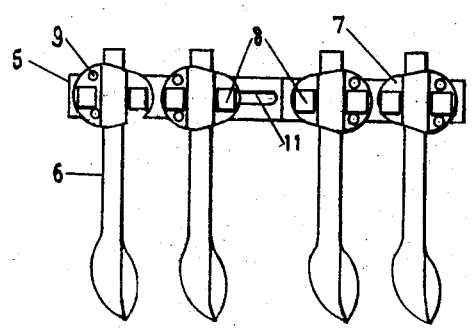
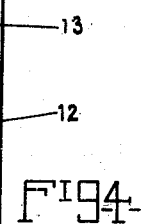
Fig. 2.
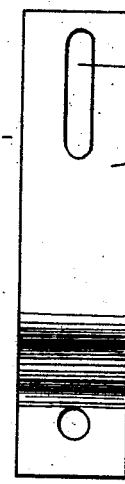
Fig. 4.
Fig. 3.
WITNESSES:
A. S. Knight
J. S. Murray
INVENTOR
Henry Thomas Smith.
BY John M. Spellman
ATTORNEY
THE NORRIS PETERS CO., WASHINGTON, D. C.

UNITED STATES PATENT OFFICE.

HENRY THOMAS SMITH, OF DE LEON, TEXAS.

SIDE HARROW FOR CULTIVATORS.

974,098.  Specification of Letters Patent.  Patented Oct. 25, 1910.

Application filed December 30, 1909. Serial No. 535,612.

*To all whom it may concern:*

Be it known that I, HENRY THOMAS SMITH, a citizen of the United States, residing at De Leon, in the county of Comanche and State of Texas, have invented certain new and useful Improvements in Side Harrows for Cultivators, of which the following is a specification.

My invention relates to new and useful improvements in side harrows for cultivators. Its object is to provide a small harrow which may be adjusted to both of the inner plow feet of a cultivator in place of the plow ordinarily carried by said plow feet.

A further object is to provide a side harrow for a cultivator, the teeth of which harrow may be adjusted vertically or at various angles.

Finally the object of the invention is to provide a device of the character described, that will be strong, durable, simple and efficient, and comparatively easy to construct and also one, the parts of which will not be likely to get out of working order.

With these and various other objects in view, my invention has relation to certain novel features of construction and operation, an example of which is described in the following specification, and illustrated in the accompanying drawing, wherein;

Figure 1 is a rear perspective view of a cultivator, having the herein described side harrow attached to the beams thereof. Figs. 2 and 3 are front and top views respectively of the harrow. Fig. 4 is a detail view of the spring used to clamp the harrow to a plow foot of the cultivator, the view being taken in the direction indicated by the arrow in Fig. 3.

Referring now more particularly to the drawing wherein like numerals of reference designate similar parts in all the figures, the numeral 1 denotes the transporting wheels of the cultivator, and 2 the U-shaped axle upon which said wheels are mounted.

The numeral 3 designates the cultivator beams extending rearwardly from the axle, and provided with plow feet 4. Upon the outer plow feet, are shown a pair of ordinary plows 4ª, and upon the inner plow feet, a pair of the herein described side harrows are shown mounted.

Each side harrow consists of a horizontal bar 5 to which are clamped a plurality of harrow teeth 6, the clamping means consisting of a plate 7 approximately U-shaped in horizontal cross section, pivoted upon a bolt 8 at one side, and provided with a plurality of bolt holes 9 at the other side so that the teeth may be attached at various angles with the vertical. At its middle, the bar 5 is provided with an indented portion 10 against which the plow foot is adapted to be clamped, a slot 11 being provided in said portion to receive the clamping bolt. The resilient bar 12 which is attached at the rear of one extremity of the bar 5 extends rearwardly at an angle approximately equal to that of the indented portion 10 of the bar, and is adapted to be clamped behind the plow foot, a slot 13 being provided to receive the clamping bolt 14.

It will be seen from the above description that a side harrow is provided, in which the teeth may be adjusted vertically or may be adjusted at an angle with the vertical toward either extremity of the bar 5. It is intended that the harrow when in position on the plow feet will form an angle of approximately 45 degrees with the direction of travel. However this angle is also capable of some adjustment.

It is obvious that the number of harrow teeth may be varied, and that various details of the construction may be modified without departing from the spirit or sacrificing the advantages of the invention. I therefore reserve the right to make such changes and alterations in said device, as fairly come with in the scope of the following claim.

What I claim is:—

A side harrow for cultivators consisting of a bar having an indented portion at its center, containing a slot longitudinal with the bar, a plurality of harrow teeth clamped to said bar, and a resilient bar secured to one extremity of the bar at the rear thereof and extending rearwardly and toward the center of the bar, a slot being provided at the other extremity of said resilient bar, and attaching means engaged in said slots.

In testimony whereof I have signed my name to this specification in the presence of two subscribing witnesses.

HENRY THOMAS SMITH.

Witnesses:
 EVAN BARKER,
 EDWIN DABNEY.